(12) United States Patent
Martinez Quintero

(10) Patent No.: US 9,248,510 B2
(45) Date of Patent: Feb. 2, 2016

(54) GUIDING TOOL FOR THE DRILL BIT OF A DRILLING APPARATUS AND DRILLING METHOD

(71) Applicant: EADS Construcciones Aeronauticas, S.A., Getafe Madrid (ES)

(72) Inventor: Javier Martinez Quintero, Getafe Madrid (ES)

(73) Assignee: EADS Construcciones Aeronauticas, S.A., Getafe Madrid (ES)

( * ) Notice: Subject to any disclaimer, the term of this patent is extended or adjusted under 35 U.S.C. 154(b) by 470 days.

(21) Appl. No.: 13/715,002

(22) Filed: Dec. 14, 2012

(65) Prior Publication Data
US 2013/0156519 A1 Jun. 20, 2013

(30) Foreign Application Priority Data
Dec. 16, 2011 (ES) .................................. 201132034

(51) Int. Cl.
B23B 49/02 (2006.01)
B23B 49/00 (2006.01)
B23Q 17/00 (2006.01)

(52) U.S. Cl.
CPC ............... *B23B 49/00* (2013.01); *B23B 49/02* (2013.01); *B23Q 17/00* (2013.01); *B23B 2215/04* (2013.01); *B23B 2260/128* (2013.01); *Y10T 408/03* (2015.01); *Y10T 408/21* (2015.01); *Y10T 408/98* (2015.01)

(58) Field of Classification Search
CPC .... B23B 49/02; B23B 2215/04; B23B 49/00; Y10T 408/03; B23Q 17/00

USPC ..................... 408/16, 241 R, 241 G; 73/1.25
See application file for complete search history.

(56) References Cited

U.S. PATENT DOCUMENTS

| 3,572,181 A * | 3/1971 | Schlegel .................... 408/16 |
| 4,778,317 A * | 10/1988 | Earle et al. ................... 409/211 |
| 4,841,817 A | 6/1989 | Tsui et al. |
| 5,848,859 A * | 12/1998 | Clark et al. ................... 408/1 R |
| 8,653,979 B2 * | 2/2014 | Obenchain ................... 340/606 |
| 2009/0035078 A1 | 2/2009 | Mejerwall et al. |
| 2011/0229280 A1 | 9/2011 | Nagase et al. |

FOREIGN PATENT DOCUMENTS

| DE | 9318014 | 2/1994 |
| EP | 276155 A1 * | 7/1988 |
| EP | 0894560 | 2/1999 |
| WO | 2006088404 | 8/2006 |

OTHER PUBLICATIONS

European Search Report, Feb. 18, 2013.

* cited by examiner

*Primary Examiner* — Eric A Gates
*Assistant Examiner* — Paul M Janeski
(74) *Attorney, Agent, or Firm* — Greer, Burns & Crain, Ltd.

(57) ABSTRACT

A guiding tool for the drill bit of a drilling apparatus and a method of making drills. The tool includes a body with an orifice for passage of the drill bit and a base with at least three protruding feet for resting on the working surface. The feet are configured with inner holes with an outlet at its ends. The tool is connected to a pneumatic device of pressurized gas supply which includes a signal indicative of correct positioning of the tool for performing a drill when a simultaneous blocking of gas output in said feet is produced when all of them are in contact with said working surface; the tool including a pressurized gas pipeline up to said feet.

14 Claims, 1 Drawing Sheet

GUIDING TOOL FOR THE DRILL BIT OF A DRILLING APPARATUS AND DRILLING METHOD

FIELD OF THE INVENTION

The present invention relates to a tool for guiding the drill bit of a drilling apparatus and to a drilling method and, more particularly, to a tool for guiding a drill bit of a drilling apparatus used in the aeronautical industry for making drills in skins of aircraft structures.

BACKGROUND OF THE INVENTION

In the aeronautical industry, and similarly in other industries, the drills to be performed on skins and other structures, which are intended to accommodate rivets, bolts, screws or any other type of useful anchorage for producing a firm attachment of several elements, should be perpendicular to the working surface within, logically, the standardized tolerances, in order to achieve optimal working conditions to ensure both the proper guidance of fasteners inserted into them, so that they can properly fulfill their function, and the correct positioning of their heads on a surface that must be fully compliant with the aerodynamic requirements, because in the aeronautical industry is essential to keep intact the aerodynamic surface.

If the executed drill has a deviation from a perpendicular direction to the working surface greater than allowed it must be repaired immediately with the disadvantages this entails.

To this end guiding tools consisting of metal pieces with an orifice for the drill bit of the drilling apparatus are being used. Operators perform drills holding with one hand the guiding tool and with the other the drilling apparatus. One of such guiding tools is described for example in U.S. Pat. No. 7,878,740.

There are also known complex guiding tools for specific needs as the one described in U.S. Pat. No. 7,164,474.

The major drawback of manual handling tools is that they cannot avoid operator errors. If, for any reason, the operator does not properly position the guiding tool, the drill is not performed in a perpendicular direction to the working surface.

The present invention is directed to the solution of this problem.

SUMMARY OF THE INVENTION

An object of the present invention is to provide guiding tools and methods of making perpendicular drills to the working surface that prevent user errors.

Another object of the present invention is to provide guiding tools and methods of making perpendicular drills to the working surface to facilitate the user's identification of the correct positioning of the guiding tool of the drill bit to perform the drill.

In one aspect, these and other objects are met by a guiding tool for the drilling bit of a drilling apparatus on a working surface, so that it is positioned perpendicular to it, comprising a body having an orifice for passage of the drill bit and a base with at least three protruding feet for resting on said working surface, being the feet configured with inner holes with an outlet at their ends. The tool can be operatively connected to a pneumatic device that supplies pressurized gas and comprises a pressurized gas pipeline ending in said feet. The pneumatic device includes means for activating a signal indicative of the correct positioning of the tool for performing a drill when, having activated the supply of pressurized gas to the tool, there is a simultaneous blocking of gas output by said feet when all of them are in contact with said working surface.

In one embodiment of the invention, said pneumatic device comprises a pressurized gas supply circuit with a pressurized gas source and a control valve, and a parallel circuit actuating an emitter of said signal controlled by a pressure bistable valve connected to the pressurized gas source and to the gas supply circuit. A guiding tool connected to a low-cost device that allows emitting a signal indicative of the correct positioning of the guiding tool to perform the drill is therefore achieved.

Advantageously, said signal is an acoustic signal and said emitter is a pneumatic whistle.

Advantageously, said signal is a light signal and said emitter is a light source.

Advantageously said pressurized gas source is a compressor.

Advantageously said pressurized gas source is a pressurized gas tank.

In one embodiment of the invention, the pressurized gas pipeline comprises a conduit connected at its inlet with said pressurized gas supply circuit and a gas distribution chamber to the feet holes, located between the base and an additional piece attached in a tight manner to it and to the body. A guiding tool adapted to the use of pneumatic means for detecting its correct positioning is therefore achieved.

Advantageously, said conduit is arranged parallel to the passing orifice of the drill bit.

Advantageously, said body has a tubular shape and said orifice is located in a central position.

In another aspect, the above mentioned objects are met by a method of making drills on a working surface in a direction perpendicular thereto, comprising the following steps: a) providing a guiding tool of the drill bit of a drilling apparatus provided with at least three feet with inner holes for resting on the working surface; b) arranging the guiding tool on the working surface in the intended position for a drill making pressurized gas to flow through said holes; c) detecting the production of a simultaneous blocking of gas output by said feet when all of them are in contact with said working surface and emitting an indicative signal of said simultaneous blocking; d) performing the drill with the drill bit of the drilling apparatus guided by said tool when said signal is received.

Advantageously, said indicative signal is an acoustic signal.

Advantageously, said indicative signal is a light signal.

A preferred field of application of the present invention is the drilling of holes in curved surfaces of aircraft structures such as fuselage skins.

Other features and advantages of the present invention will become apparent from the following detailed description in connection with the accompanying Figures.

DETAILED DESCRIPTION OF THE PREFERRED EMBODIMENTS

Figure 1:
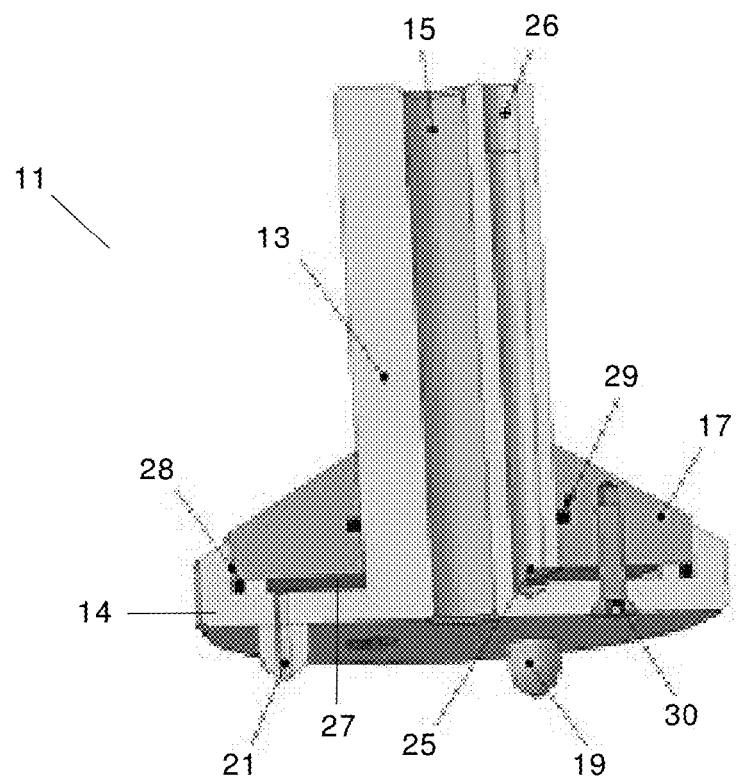
FIG. 1 is a perspective view of the tool object of the present invention (without being connected to the pneumatic device).
Figure 2:
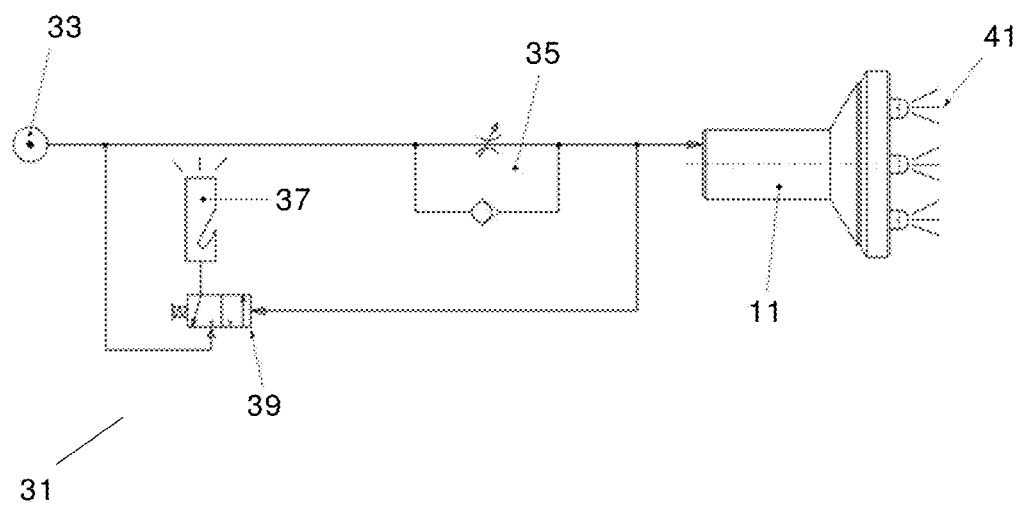
FIG. 2 shows a lateral sectional view of the tool object of the present invention and associated with it a functional diagram of the pneumatic device to which it is connected.

FIGS. 1 and 2 show a guiding tool 11 according to the invention with a tripod shape having a tubular body 13 with a central orifice 15 for the passage of the drill bit (not shown) and a surrounding base 14 having a circular section and at least three feet 19 arranged at an angular distance of 120° between them.

The guiding tool 11 has a pipeline of pressurized gas, for example compressed air, supplied by a pneumatic device 31 to which it is connected, constituted by the conduit 25, parallel to the central orifice 15, the distribution chamber 27, formed between the surrounding base 14 and the piece 17 fixed to the surrounding base 14 by screws 30 and joined thereto and to the tubular body 13 in a tight manner through O-rings 28, 29, and the holes 21 in the feet 19.

The pneumatic device 31 supplies the pressurized gas produced by a pressurized gas source 33 and regulated by the valve 35 through the inlet 26 of conduit 25 to exit through the feet 19 in the form of jets 41.

The pressurized gas source 33 can be, for example, a compressor or a pressurized gas tank.

The pneumatic device 31 also comprises a pneumatic whistle 37 actuating circuit which is controlled by a bistable pressure valve 39 connected to the compressor 33 and the gas supply circuit so that if the gas output through the feet 19 is blocked simultaneously because they are properly positioned on the working surface, there is a drop in pressure that opens the valve 39 and thereby activates the pneumatic whistle 37.

Using the guiding tool 11, the operator that performs drills on a working surface has thus two sources of information to be sure that the drilling machine is correctly positioned when performing a drill:

the tactile sensation that the three feet 19 rest on the working surface;

the acoustic signal emitted by the guiding tool 11.

Alternatively to the acoustic signal produced by the pneumatic whistle 37, the pneumatic device 31 can produce other signals using the appropriate emitters thereof instead of the pneumatic whistle.

Although the present invention has been described in connection with various embodiments, it will be appreciated from the specification that various combinations of elements, variations or improvements therein may be made, and are within the scope of the invention.

The invention claimed is:

1. A guiding tool for the drill bit of a drilling apparatus on a working surface, so that it is positioned perpendicularly to it, comprising a body having an orifice for passage of the drill bit and a base with at least three protruding feet for resting on said working surface, comprising:
   a) the feet are configured with inner holes with an outlet at their ends;
   b) the guiding tool comprises a pressurized gas pipeline ending in said feet operatively connected to a pneumatic device that supplies pressurized gas;
   c) said pneumatic device includes a signal indicative of the correct positioning of the tool for performing a drill when, having activated the supply of pressurized gas to the tool, there is a simultaneous blocking of gas output by said feet when all of them are in contact with the working surface,
   wherein said pneumatic device comprises a pressurized gas supply circuit, having a pressure gas source and a regulating valve, and an actuating parallel circuit of an emitter of said signal controlled by a bistable pressure valve connected to the pressurized gas source and to the gas supply circuit.

2. The guiding tool according to claim 1, wherein said signal is an acoustic signal and said emitter is a pneumatic whistle.

3. The guiding tool according to claim 1, wherein said signal is a light signal and said emitter is a light source.

4. The guiding tool according to claim 1, wherein said pressurized gas source is a compressor.

5. The guiding tool according to claim 1, wherein said pressurized gas source is a pressurized gas tank.

6. The guiding tool according to claim 1, wherein the pressurized gas pipeline comprises a conduit connected at its inlet with said pressurized gas supply circuit and a gas distribution chamber to the holes of the feet located between the base and an additional piece connected in a tight manner to it and to the body.

7. The guiding tool according to claim 6, wherein said conduit is arranged parallel to the orifice for passage of the drill bit.

8. The guiding tool according to claim 1, wherein said body has a tubular shape and said orifice is located in a central position.

9. The guiding tool according to claim 1, wherein said working surface is the surface of an aeronautical structure.

10. A method of making drills in a working surface in a direction perpendicular thereto, comprising the following steps:
   a) providing a guiding tool for the drill bit of the drilling apparatus provided with at least three feet with inner holes for resting on the working surface;
   b) arranging the guiding tool on the working surface in the intended position for a drill making pressurized gas to flow through said holes;
   c) detecting the simultaneous blocking of gas output by said feet when all of them are in contact with said working surface and emitting a signal indicative of said simultaneous blocking;
   d) performing the drill with the drill bit of the drilling apparatus guided by said tool when said signal is received; and
   e) providing a pressurized gas supply circuit, having a pressure gas source and a regulating valve, and an actuating parallel circuit of an emitter of said signal controlled by a bistable pressure valve connected to the pressurized gas source and to the gas supply circuit.

11. The method according to claim 10, wherein said indicative signal is an acoustic signal.

12. The method according to claim 10, wherein said indicative signal is a light signal.

13. The method according to claim 10, wherein said working surface is a curved surface.

14. The method according to claim 10, wherein said working surface is the surface of an aeronautical structure.

* * * * *